United States Patent
Blom

[19]

[11] Patent Number: 6,079,880
[45] Date of Patent: Jun. 27, 2000

[54] CONNECTOR FOR AT LEAST ONE OPTICAL FIBRE

[75] Inventor: Claes Blom, Skanninge, Sweden

[73] Assignee: Telefonaktiebolaget LM Ericsson, Stockholm, Sweden

[21] Appl. No.: 09/038,713

[22] Filed: Mar. 9, 1998

[30] Foreign Application Priority Data

Mar. 20, 1997 [SE] Sweden .................................. 97010276

[51] Int. Cl.[7] ...................................................... G02B 6/38
[52] U.S. Cl. ................................ 385/60; 385/55; 385/62; 385/70; 385/72; 385/77; 385/78; 385/81; 385/139
[58] Field of Search .................................. 385/55, 56, 60, 385/62, 66, 70, 72, 77, 78, 81, 84, 87, 139

[56] References Cited

U.S. PATENT DOCUMENTS

| | | | |
|---|---|---|---|
| 4,690,494 | 9/1987 | Hirose et al. | 385/60 X |
| 4,787,701 | 11/1988 | Stenger et al. | 385/60 X |
| 5,394,497 | 2/1995 | Erdman et al. | 385/78 |
| 5,542,015 | 7/1996 | Hultermans | 385/60 |
| 5,719,977 | 2/1998 | Lampert et al. | 385/60 |
| 5,930,426 | 7/1999 | Harting et al. | 385/56 |

FOREIGN PATENT DOCUMENTS

| | | | |
|---|---|---|---|
| 0375168 | 6/1990 | European Pat. Off. | 385/60 X |
| 0599780A1 | 1/1994 | European Pat. Off. | 385/60 X |
| 2239104 | 6/1991 | United Kingdom | 385/60 X |

*Primary Examiner*—Brian Healy

[57] ABSTRACT

The present invention relates to optical connectors and concerns a connector (1) for connecting at least one optical fibre (2) in a so-called integrated optical interface, wherein a ferrule fiber end, in order to contact a second ferrule fiber end, is pressed towards said second end and is retained in this position. Because the first ferrule (11), creating the optical interface, is placed just outside a wall in an opto-electrical component (3), and the second ferrule (6), of a same kind of or similar ferrule, is placed inside the connector (1), it is possible to mutually align two optical fibers in a cost efficient way. In order to retain the contact between the fiber ends in a contact position, the connector (1) comprises two hook members (12), the hooked ends (13) of which can be hooked into grooves (14) provided in the component (3). To release the connector from the component, only a slight pressure needs to be applied to the hook elements, whereby the hooked ends of the hook elements are released from the grooves, and the connector can be separated from the component.

6 Claims, 1 Drawing Sheet

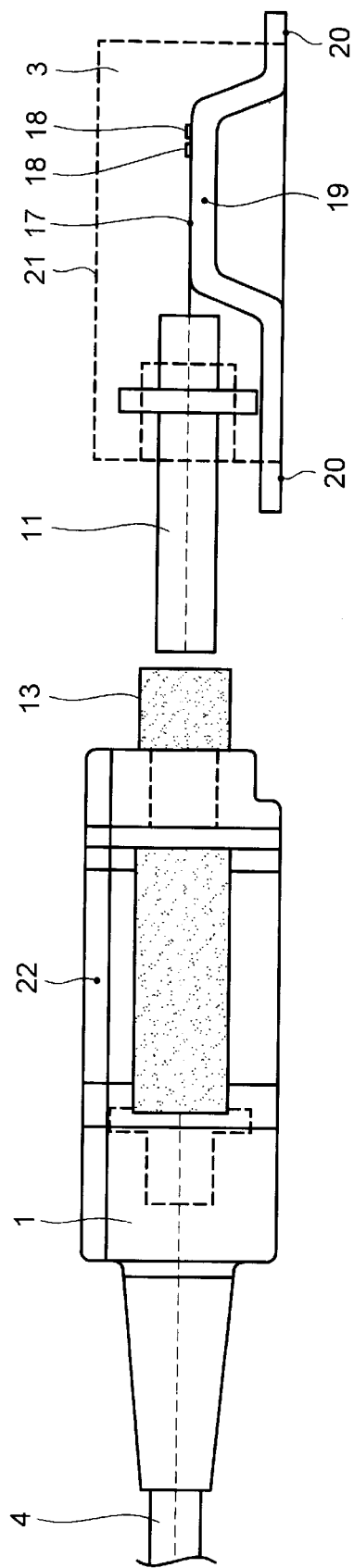
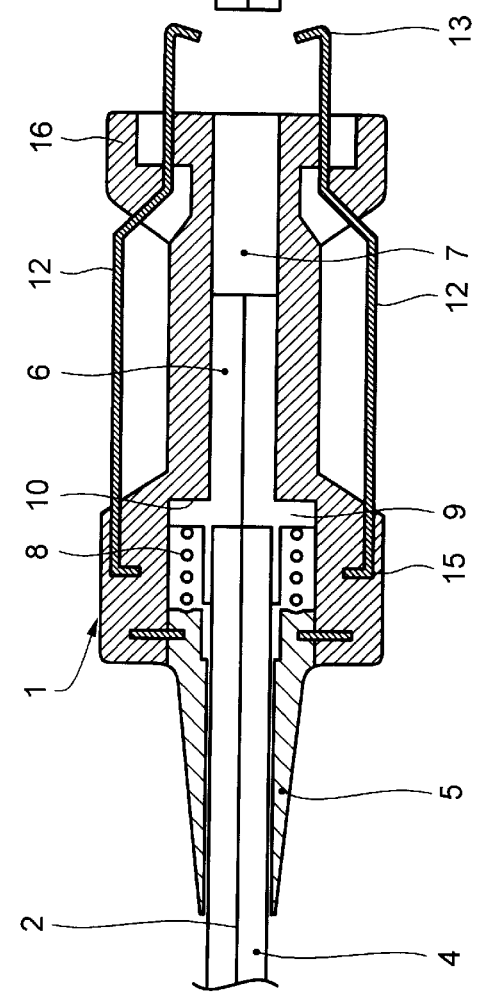

CONNECTOR FOR AT LEAST ONE OPTICAL FIBRE

TECHNICAL FIELD

The present invention relates to optical components but can also be used in opto electrical connectors, and preferably concerns a device for contacting at least one optical fibre in a so called integrated optical interface, wherein a fibre end, for instance contained in a plastic housing, is pressed towards another fibre end and is retained in this position in order to establish and maintain contact there between. Plastic housings with a so called integrated optical interface are used in opto and opto-electric circuits, together with thereto adapted components. The term component in this text mainly refers to a product ready for mounting on for instance a printed circuit board. Opto-electrical modules and sub-moduls are types of components according to the above.

STATE OF THE ART

Opto-electrical components according to the state of the art are usually provided with a fibre tail, constituting a fibre of variable length protruding from the component and often are provided with a connector of some sort. The part of the fibre which is inside the connector is usually ended by an interface to some opto-electric circuit or a lens.

A fibre tail ending in a wall of the opto-electrical component presents a substantial obstacle when it comes to producing submodules or modules in a cost efficient way. The term obstacle here preferably refers to the fact that the optical fibre is physically in the way of automated production, and the result can be stoppages in production. Furthermore, equipment designed for automated production will fetch a higher price if components with fibre tail are to be handled. At, for instance, polishing of a fibre end, the fibre is often let to hang from a polishing machine, and the number of fibre ends that can be polished is limited. Packing of finished components with fibre tail therefor has to occur in bulky containers so that the fibre is not damaged. Both when handling at a customer's and when mounting on a printed circuit board, the fibre tail can present a not unessential problem.

From, for instance, the document EP-A2-0 125 499 and the patent U.S. Pat. No. 5,452,390, connectors are previously known for optical fibres with, in which the fibre ends are pressed together for contact. The compressive force for contact between the fibre ends is partly provided by a spring acting on one of the ferrules.

SUMMARY OF THE INVENTION

The first ferrule, creating the optical interface, is placed just outside a wall of an opto-electrical component and the second ferrule, of a same or similar ferrule, is placed inside a connector. It is therefore possible to mutually align two optical fibres. In order to maintain the contact between two fibre ends in a contact position, the connector is provided with hook members, which can be hooked into grooves arranged in the component. Furthermore, this construction make it possible to machine the two fibre ends of the ferrules using fully or semi automated equipment. The packing of finished components with optical interface according to the invention can be made in not so costly so-called tubes of anti-static material or in component trays, whereby the transport goods becomes less bulky. When mounting components with optical interface according to the invention on a printed circuit board, automated mounting equipment can be used, which should contribute strongly to good sales of such components.

DESCRIPTION OF THE DRAWINGS

FIG. 1 shows a side view of a connector with an integrated optical interface according to the invention.

FIG. 2 shows a top view of the connector of FIG. 1, partly in cross section.

PREFERRED EMBODIMENTS

FIGS. 1 and 2 illustrate how a connector 1 for an optical fibre 2 is made according to the invention, for instance, as a plastic housing with possible opto-electrical or electrical circuits and with an integrated optical interface, and how a components adapted thereto can be arranged. The optical fibre 2 surrounded by a protective cover 4 is inserted through an elastic inlet 5 connected to the connector 1, whereby the end of the optical fibre 2 is inserted into a ferrule 6, and the cover 4 of the optical fibre 2 is connected to the ferrule 6, the ferrule 6 acting in a corresponding cylindrical space arranged in the connector 1. In the connector 1, between the movable ferrule 6 with the optical fibre 2 and the inlet 5 connected to the connector 1, there is a spring 8, pressing a collar 9 of on the ferrule 6 with the optical fibre towards a stopping contact surface 10 in the connector 1. The spring members 8 can be substantially arranged as a coil spring surrounding one end of the ferrule 6 and acting between the collar 9 of the ferrule and an end of the inlet 5. If a possible elongation strain were to act on the cover 4 of the optical fibre, the spring members 8 will be compressed, and the ferrule 6 with the cover 4 will be extended without damage to the optical fibre 2. In front of the ferrule 6 with the optical fibre 2 there is in the cylindrical space 7 room for a corresponding protruding ferrule 11 on the connectable component 3. When the connector is to be connected to the component, the connector is slipped over the ferrule 11 of the component 3, and the ends of the ferrules 6, 11 meet in the cylindrical space 7 in the connector 1, optical fibre end to optical fibre end, for transmission of light between the optical fibres.

To maintain contact between the optical fibre ends, the connector 1 is provided with at least one resilient hook member, but preferably two oppositely arranged hook members 12, which are arranged such that they for connecting the connector/plastic capsule 1 to the component 3 when the connector 1 is slipped over the ferrule 11 of the connectable component. Can engage their free, resilient and hooked ends 13 into grooves 14 or recesses that are arranged in the component at the fibre contact position. As such, hook members 12 for connecting the connector/plastic capsule 1 to the component 3 when the connector 1 is slipped over the ferrule 11 of the connectable component 3. The other ends 15 of the hook members are permanently fixed to the end of the connector, for instance, in the spring location area. Inside the hooked ends 13 of the hook members 12 in a connector housing 16 on the connector 1 in the location of the intruding component's ferrule 11, the hook members 12 are arranged balanced, so that their free ends 13 can be moved in two directions to and from the grooves 14 or recesses arranged in the component 3.

Because the hook members 12 have been designed as elongated leaf springs, the free ends 13 of the hook members can be operated by a slight compression of the spring members 8 around the connector. When the leaf springs 12 between the permanently fixed ends 15 and the balanced arranged states in the connector housing 16 are pressed towards the connector 1, the hooks 13 will be lifted out of the grooves 14, whereby the connector and the component can be pulled apart, and the optical connection is broken.

The component 3 can, apart from the ferrule 11 for an optical fibre 17, be provided with opto-electrical circuits 18 connected to the fibre 17 on a frame 19. For providing electrical contact with a printed circuit board or another carrier, the component 3 may be provided with soldering pads 20. The parts of the component 2 can also be protected by an external cover 21, just as the connector 1 can be provided with a protective cap 22.

With the connector 1 and the component 3 designed according to the invention, they can easily be connected, and optical contact is provided between the optical fibres of the connector and the component. Following only a slight pressure applied to the leaf springs, the housing and the component can be pulled apart, and the optical contact can be broken, providing high reliability at a low cost.

I claim:

1. A connector for at least one optical fibre having a plastic housing with a flexible connectable fibre end, the connector comprising:

at least one spring member having a hooked end arranged to engage a groove or a recess in a connectable component that includes an optical fibre with which the optical fibre of the connector contacts, the connector having a hooked end that fixes the connector with respect to the component, whereby the optical fibres of the connector and the component are in contact wherein the spring member is oriented such that it is physically accessible to an operator to enable connection and disconnection of the connector.

2. A connector according to claim 1, wherein the connector further comprises:

an outer surface forming a cylindrical space adapted to receive the end of the optical fibre of the connectable component, and a ferrule that is restrictedly movable in the cylindrical space, the ferrule including:

a collar acting between a surface and a spring in the connector, where the cylindrical space has a sufficient amount of space to accommodate the ferrule end and an end of a corresponding projecting ferrule of the connectable component.

3. A connector for at least one optical fibre having a plastic housing with a flexible connectable fibre end, the connector comprising:

at least one spring member having a hooked end arranged to engage a groove or a recess in a connectable component that includes an optical fibre with which the optical fibre of the connector contacts the connector having a hooked end that fixes the connector with respect to the component, whereby the optical fibres of the connector and the component are in contact, wherein one end of the spring member is permanently fixed to the connector, and wherein another end of the spring member is rotatably arranged in a contact housing of the connector.

4. A connector according to claim 3, wherein the spring member is a leaf spring.

5. A connector according to any of claims 1–4, wherein the at least one spring member comprises two spring members that are oppositely arranged on the connector with hooked ends engaged into the grooves or recesses of the component.

6. The connector according to claim 1, wherein a side portion of the spring member is positioned such that the spring member may be manipulated by the operator to enable engagement or disengagement of the connector with the connectable component.

* * * * *